(12) United States Patent
de Wit

(10) Patent No.: US 7,697,518 B1
(45) Date of Patent: Apr. 13, 2010

(54) INTEGRATED SEARCH ENGINE DEVICES AND METHODS OF UPDATING SAME USING NODE SPLITTING AND MERGING OPERATIONS

(75) Inventor: Pascal de Wit, Ontario (CA)

(73) Assignee: Netlogic Microsystems, Inc., Mountain View, CA (US)

( * ) Notice: Subject to any disclaimer, the term of this patent is extended or adjusted under 35 U.S.C. 154(b) by 719 days.

(21) Appl. No.: 11/532,225

(22) Filed: Sep. 15, 2006

(51) Int. Cl.
H04L 12/28 (2006.01)
H04L 12/56 (2006.01)

(52) U.S. Cl. .................................... 370/389

(58) Field of Classification Search ............... 370/389
See application file for complete search history.

(56) References Cited

U.S. PATENT DOCUMENTS

| | | | |
|---|---|---|---|
| 4,606,002 A | | 8/1986 | Waisman et al. |
| 5,228,115 A | | 7/1993 | Natarajan |
| 5,261,088 A | * | 11/1993 | Baird et al. ............... 707/206 |
| 5,430,869 A | | 7/1995 | Ishak et al. |
| 5,446,887 A | | 8/1995 | Berkowitz |
| 5,475,837 A | | 12/1995 | Ishak et al. |
| 5,560,007 A | | 9/1996 | Thai |
| 5,644,763 A | * | 7/1997 | Roy ............................ 707/101 |
| 5,666,494 A | | 9/1997 | Mote, Jr. |
| 5,758,356 A | | 5/1998 | Hara et al. |
| 5,787,430 A | | 7/1998 | Doeringer et al. |
| 5,812,996 A | | 9/1998 | Rubin et al. |
| 5,813,000 A | | 9/1998 | Furlani |
| 5,822,749 A | | 10/1998 | Agarwal |
| 5,897,655 A | | 4/1999 | Mallick |
| 5,918,245 A | | 6/1999 | Yung |
| 5,924,115 A | | 7/1999 | Von Herzen et al. |
| 6,098,150 A | | 8/2000 | Brethour et al. |
| 6,115,792 A | | 9/2000 | Tran |
| 6,138,123 A | * | 10/2000 | Rathbun ..................... 707/201 |

(Continued)

FOREIGN PATENT DOCUMENTS

WO  WO2004088548 A1  10/2004

OTHER PUBLICATIONS

Applicant Admitted Prior Art (AAPA) (Answers.com B-tree Web pp. 1-6) printed Aug. 1, 2006.*

(Continued)

*Primary Examiner*—Dang T Ton
*Assistant Examiner*—Frederick Ott
(74) *Attorney, Agent, or Firm*—Mahamedi Paradice Kreisman LLP; William L. Paradice, III

(57) ABSTRACT

Methods of updating b-tree data structures (e.g., b*tree data structure) using search key insertion and deletion operations proceed from respective known states (e.g., respective canonical forms). These insertion operations include inserting a first search key into the b-tree by reconfiguring (e.g., pre-processing) a plurality of sibling nodes of the b-tree into a predetermined overloaded form having a shape that is independent of a value of the first search key to be inserted therein. An operation is then performed to split the sibling nodes by redistributing the first and other search keys among an expanded plurality of the sibling nodes. These insertion operations use a process that trades off possibly performing additional memory accesses (e.g., to shift search keys (and/or handles or pointers) to the predetermined overloaded form) for the certainty that the same key movements are ultimately performed during operations to split sibling nodes.

5 Claims, 15 Drawing Sheets

U.S. PATENT DOCUMENTS

| | | | |
|---|---|---|---|
| 6,219,662 B1 | 4/2001 | Fuh et al. | |
| 6,389,507 B1 | 5/2002 | Sherman | |
| 6,401,117 B1 | 6/2002 | Narad et al. | |
| 6,404,752 B1 | 6/2002 | Allen, Jr. et al. | |
| 6,421,730 B1 | 7/2002 | Narad et al. | |
| 6,430,527 B1 | 8/2002 | Waters et al. | |
| 6,441,053 B1 | 8/2002 | Klein et al. | |
| 6,460,112 B1 | 10/2002 | Srinivasan et al. | |
| 6,460,120 B1 | 10/2002 | Bass et al. | |
| 6,480,839 B1 * | 11/2002 | Whittington et al. | 707/3 |
| 6,490,592 B1 | 12/2002 | St. Denis et al. | |
| 6,522,632 B1 | 2/2003 | Waters et al. | |
| 6,526,055 B1 | 2/2003 | Perlman et al. | |
| 6,532,457 B1 | 3/2003 | Tal et al. | |
| 6,535,491 B2 | 3/2003 | Gai et al. | |
| 6,539,369 B2 | 3/2003 | Brown | |
| 6,553,370 B1 | 4/2003 | Andreev et al. | |
| 6,564,211 B1 | 5/2003 | Andreev et al. | |
| 6,611,832 B1 | 8/2003 | van Lunteren | |
| 6,633,865 B1 | 10/2003 | Liao | |
| 6,636,849 B1 | 10/2003 | Tang et al. | |
| 6,636,956 B1 | 10/2003 | Venkatachary et al. | |
| 6,662,287 B1 | 12/2003 | Andreev et al. | |
| 6,691,124 B2 | 2/2004 | Gupta et al. | |
| 6,694,323 B2 | 2/2004 | Bumbulis | |
| 6,697,276 B1 | 2/2004 | Pereira et al. | |
| 6,707,693 B1 | 3/2004 | Ichiriu | |
| 6,757,779 B1 | 6/2004 | Nataraj et al. | |
| 6,768,739 B1 | 7/2004 | Kobayashi et al. | |
| 6,778,530 B1 | 8/2004 | Greene | |
| 6,831,850 B2 | 12/2004 | Pereira et al. | |
| 6,839,800 B2 | 1/2005 | Stark | |
| 6,859,455 B1 * | 2/2005 | Yazdani et al. | 370/392 |
| 6,934,795 B2 | 8/2005 | Nataraj et al. | |
| 6,941,314 B2 | 9/2005 | Andreev et al. | |
| 6,944,709 B2 | 9/2005 | Nataraj et al. | |
| 7,007,027 B2 * | 2/2006 | Najork et al. | 707/10 |
| 7,016,904 B1 | 3/2006 | Grove et al. | |
| 7,017,021 B2 | 3/2006 | Gupta et al. | |
| 7,023,807 B2 | 4/2006 | Michels et al. | |
| 7,035,844 B2 | 4/2006 | Andreev et al. | |
| 7,047,317 B1 | 5/2006 | Huie et al. | |
| 7,076,602 B2 | 7/2006 | Stark et al. | |
| 7,107,263 B2 | 9/2006 | Yianilos et al. | |
| 7,231,373 B2 | 6/2007 | Kidd et al. | |
| 7,231,383 B2 | 6/2007 | Andreev et al. | |
| 7,257,530 B2 | 8/2007 | Yin | |
| 7,289,979 B2 | 10/2007 | Wilson | |
| 7,292,162 B2 | 11/2007 | Somasundaram | |
| 7,383,276 B2 | 6/2008 | Lomet | |
| 7,426,518 B2 | 9/2008 | Venkatachary et al. | |
| 7,437,354 B2 | 10/2008 | Venkatachary et al. | |
| 7,571,156 B1 | 8/2009 | Gupta et al. | |
| 2002/0089937 A1 | 7/2002 | Venkatachary et al. | |
| 2002/0146009 A1 | 10/2002 | Gupta et al. | |
| 2002/0152413 A1 | 10/2002 | Waters et al. | |
| 2002/0161969 A1 | 10/2002 | Nataraj et al. | |
| 2003/0009453 A1 | 1/2003 | Basso et al. | |
| 2003/0009466 A1 | 1/2003 | Ta et al. | |
| 2003/0093613 A1 | 5/2003 | Sherman | |
| 2003/0093646 A1 | 5/2003 | Stark | |
| 2003/0123397 A1 | 7/2003 | Lee et al. | |
| 2003/0123459 A1 | 7/2003 | Liao | |
| 2003/0163302 A1 | 8/2003 | Yin | |
| 2004/0030686 A1 | 2/2004 | Cardno et al. | |
| 2004/0059731 A1 | 3/2004 | Yianilos et al. | |
| 2004/0083336 A1 | 4/2004 | Stark et al. | |
| 2004/0109451 A1 | 6/2004 | Huang et al. | |
| 2004/0139274 A1 | 7/2004 | Hui | |
| 2004/0170379 A1 | 9/2004 | Yao et al. | |
| 2004/0193619 A1 | 9/2004 | Venkatachary et al. | |
| 2004/0205229 A1 | 10/2004 | Stojancic | |
| 2004/0249803 A1 | 12/2004 | Vankatachary et al. | |
| 2005/0091443 A1 | 4/2005 | Hershkovich et al. | |
| 2005/0131867 A1 | 6/2005 | Wilson | |
| 2005/0163122 A1 | 7/2005 | Sahni et al. | |
| 2006/0259682 A1 | 11/2006 | Somasundaram | |
| 2007/0276648 A1 | 11/2007 | Andreev et al. | |

OTHER PUBLICATIONS

"Tree (data structure)," http://en.wikipedia.org/wiki/Tree_data_structure, (Redirected from Tree data structure, Admitted prior art, 2 pages.

"Answers.com," http://www.answers.com/topic/b-tree, B-tree: Information From Answers.com, Admitted prior art, 6 pages.

"Canonical form," http://en.wikipedia.org/wiki/Canonical_form, Admitted prior art, 1 page.

"B*-tree," http://en.wikipedia.org/wiki/B%2A-tree, Admitted prior art, 1 page.

Aggarwal et al. "A Model for Hierarchical Memory" *Proceedings of the Nineteenth Annual ACM Conference on Theory of Computing STOC* pp. 305-314 (1987).

"B-Trees: Balanced Tree Data Structures" pp. 1-8 (believed prior to Sep. 15, 2006) <http://www.bluerwhite.org/btree/>.

Choudhury et al. "A New Buffer Management Scheme for Hierarchical Shared Memory Switches" *IEEE/ACM Transactions on Networking (TON)* 5(5):728-738 (1997).

Djordjevic et al. "A Hierarchical Memory System Environment" *Proceedings of the 1988 Workshop on Computer Architecture Education WCAE* (6 pages)(1998).

Lu et al. "A B-Tree Dynamic Router-Table Design" pp. 1-27 (believed prior to Sep. 15, 2006).

Suri et al. "Multiway Range Trees: Scalable IP Lookup with Fast Updates" (5 pages)(believed prior to Sep. 15, 2006) http://www.cs.edu/~Varghese/PAPERS/globecome2001.pdf.

"A B-Tree Dynamic Router-Table Design," IEEE Transactions on Computers, vol. 54, Issue 7, Jul. 2005, 27 pages.

O'Connor et al., "The Iflow Address Processor," 2001 IEEE, pp. 16-23.

Chang et al., "Dynamic Routing Tables using Augmented Balanced Search Tree," National Cheng Kung University/I-Shou University, No Date, 35 pages.

"Network address processor makes embedded DRAM a virtue," http://www.electronicproducts.com/print.asp?ArticleURL=octo12.oct2000, Printed Aug. 14, 2006, Admitted Prior Art, 1 page.

Bayer, R. et al., "Prefix B-Trees," ACM Trans. On Database Systems, vol. 2, No. 1, Mar. 1977, pp. 11-26.

Bender et al. "Cache-oblivious B-trees", SIAM J. Comput, 2000, pp. 1-18.

Henry Hong-yi Tzeng, "Longest Prefix Search Using Compressed Trees", In Proceedings of IEEE Globe.com, 1998.

Kobayashi et al. "A Longest Prefix Match Search Engine for Multi-Gigabit IP Processing", C&C Media Research Laboratories, NEC Corporation 2000 IEEE.

Nasser Yazdani et al., "Prefix Trees: New Efficient Data Structures for Matching Strings of Different Lengths", IEEE, 2001, p. 76-85.

Srinivasan et al. "Fast Address Lookups Using Controlled Prefix Expansion" Washington University in St. Louis, ACM Sigmetrics '98/ Performance '98 Joint International Conference on Measurement and Modeling of Computer Systems.

Uga et al. "A fast and compact longest match prefix look-up method using pointer cache for very long network address", IT Network Service Systems Laboratories Midori 3-9-1 1, Musashino, Tokyo 180-8585, Japan, 1999 IEEE.

* cited by examiner

INSERT ANY KEY BY PREPROCESSING NODES INTO CANONICAL FORM PRIOR TO SPLIT

PERFORM SPLIT OPERATION

INTEGRATED SEARCH ENGINE DEVICES AND METHODS OF UPDATING SAME USING NODE SPLITTING AND MERGING OPERATIONS

CROSS-REFERENCE TO RELATED APPLICATIONS

This application is related to U.S. application Ser. No. 11/184,243, filed Jul. 19, 2005, and U.S. application Ser. No. 11/374,622, filed Mar. 13, 2006, the disclosures of which are hereby incorporated herein by reference.

FIELD OF THE INVENTION

The present invention relates to integrated circuit devices and, more particularly, to integrated circuit search engine devices and methods of operating same.

BACKGROUND OF THE INVENTION

Linear sorting techniques may be utilized to arrange a plurality of search prefixes (a/k/a search "keys") within an integrated circuit search engine device. One such linear sorting technique is based on the starting address of a prefix range associated with each search prefix. In the event a plurality of the search prefixes have the same starting address but different prefix lengths, then a search prefix with a shorter prefix length may be treated as "less than" a search prefix with a longer prefix length. One example of a plurality of 8-bit search prefixes is illustrated by TABLE 1.

The search prefixes in TABLE 1 may be sorted linearly as shown in FIG. 1, with the smallest search prefix having the shortest prefix length (e.g., A:0/0) located on the left side of the array 10 and the largest search prefix with the longest search prefix (e.g., M:240/5) located on the right side on the array 10. To perform a linear search (i.e., lookup) operation, an applied search key is compared with every search prefix in the array 10, starting with the search prefix on the left side of the array 10, until a search prefix is found with a start address that is greater than the applied search key. Each search prefix in the array 10 that matches the applied search key is a potential longest prefix match. Once the search operation terminates at the right side of the array 10 (or at a search prefix with a start address than is greater than the applied search key), the rightmost search prefix that matches the search key is treated as the longest prefix match (LPM).

TABLE 1

| ID | KEY |
|----|-----|
| A | 0/0 |
| B | 0/1 |
| C | 0/2 |
| D | 0/3 |
| E | 0/4 |
| F | 144/4 |
| G | 192/3 |
| H | 224/3 |
| I | 240/4 |
| J | 128/2 |
| K | 208/5 |
| L | 128/1 |
| M | 248/5 |
| N | 160/4 |
| O | 96/3 |
| P | 112/4 |
| Q | 168/6 |
| R | 170/8 |

TABLE 1-continued

| ID | KEY |
|----|-----|
| S | 120/5 |
| T | 0/5 |
| U | 192/2 |
| V | 64/2 |

This search operation is an iterative process, with each search prefix being compared in sequence with the applied search key. As illustrated by FIG. 2, this process can also be implemented in a hardware-based array 20, by simultaneously comparing the applied search key (e.g., 171) to all of the search prefixes within the array 20, using a plurality of comparators 22 that generate match and non-match signals. In particular, each match between the applied search key and a search prefix results in the generation of a match signal (M) and each non-match results in the generation of a "less than" signal (LT) or a "greater than" signal (GT). The comparators 22 may generate these signals as two-bit binary signals (e.g., M=11b, LT=01b, and GT=10b). The longest prefix match is represented by the search prefix associated with the rightmost match signal M, which in FIG. 2 is represented by the search prefix Q:168/2. This longest prefix match may be identified using a priority encoder (not shown) that is configured to receive the signals generated by the comparators 22.

Conventional network routing applications may also utilize tree data structures to support search operations within an integrated circuit device. These tree data structures may include b-tree structures that are kept balanced to prevent one or more branches of the tree from becoming longer than other branches of the tree and thereby increasing search latency. FIG. 3 illustrates a three-level b-tree data structure 30 containing the search prefixes of TABLE 1 and the array 20 of FIG. 2. This b-tree 30 is illustrated as including six leaf nodes at Level 2 (i.e., Nodes 2-0, 2-1, 2-2, 2-4, 2-5 and 2-6), two intermediate nodes at Level 1 (Node 1-0 and 1-1) and a root node at Level 0 (Node 0-0).

As illustrated by the highlighted search path, a search of the b-tree using 171 as a search key begins at Node 0-0. The search prefix J at Node 0-0 represents a match with the search key 171 because 171 (i.e., 10101011b) is a match with 128/2 (i.e., 10XXXXXX), where X represents a "don't-care" value. The search then proceeds to Node 1-1 (i.e., along a right-side branch from Node 0-0 to Node 1-1) because 171 is greater than 128. No matches are present at Node 1-1 because the search key 171 (i.e., 10101011b) does not match either the search prefix R:170/8 (10101010b) or the search prefix H:224/3 (i.e., 111XXXXX). Because the search key 171 is greater than 170 and less than 224, the search then proceeds to and terminates at Node 2-5, which is a leaf node of the b-tree 30. None of the search prefixes U:192/2, G:192/3 or K:208/5 at Node 2-5 represent a match with the search key 171. Thus, based on the illustrated search path, which traverses Nodes 0-0, 1-1 and 2-5 of the b-tree 30, only search prefix J:128/2 represents a matching entry with the search key 171. However, as illustrated best by FIG. 2, the search prefix Q:168/6, which resides at Node 2-4 of FIG. 3, actually represents the longest prefix match with the search key 171, yet this search prefix was not within the search path and was not detected during the search operation. Moreover, the search prefixes A:0/0, L:128/1 and N:160/4 also represent matches that were not within the search path. This means that the conventional sorting of prefixes within the b-tree 30 of FIG. 3 will not yield correct results for all search keys. To address this limitation associated with the b-tree 30 of FIG. 3, span prefix masks have been used to support accurate longest prefix match search operations. These masks are described more fully in commonly assigned U.S. application Ser. No. 11/184,243, filed Jul. 19, 2005, the disclosure of which is hereby incorporated herein by reference.

Another example of a b-tree data structure is described in U.S. Pat. No. 6,490,592, which is assigned to Nortel Networks Limited. As described at Col. 1 of the '592 patent, conventional b-tree data structures may not be well suited for search operations that require identification of longest prefix matches (LPMs) within the b-tree data structure. To address this limitation, the '592 patent describes a modified b-tree data structure that is arranged so that data elements stored therein, which have no overlapping prefixes, are arranged in a standard b-tree structure. However, other data elements that have overlapping prefixes are arranged in a modified structure so that the prefix of such a data element contains the prefixes of all such data elements that succeed it in the b-tree. This modified structure is referred to as an L-structure. FIG. 3 of the '592 patent shows portions 300 and 340 that comprise a b-tree into which an L-structure 320 is inserted. Unfortunately, the use of L-structures within a b-tree may represent a form of prefix nesting that reduces a likelihood of achieving preferred b-tree properties that can reduce search latency and result in efficient utilization of memory space. In particular, for a fixed memory capacity and latency, which is related to tree height, the number of search prefixes that can be supported within the b-tree of the '592 patent is statistically dependent on the degree of nesting within the prefix data set supported by the b-tree. Accordingly, prefix data sets that require a high degree of nesting may result in an inefficient utilization of the memory space that is required to maintain the b-tree.

An additional type of b-tree data structure includes a b*tree data structure, which can require non-root nodes to be at least ⅔ full at all times. To maintain this fill requirement, a sibling node is not immediately split whenever it is full. Instead, keys are first shared between sibling nodes before node splitting is performed. Only when all sibling nodes within a group are full does a node splitting operation occur upon insertion of a new search key. FIG. 4 illustrates a conventional three-level b*tree data structure of ¾ efficiency (i.e., N/(N+1)=3/4), having four key locations per node (i.e., M=4). These three levels are illustrated as L0, L1 and L2, where L0 is treated as the root level and L2 is treated as a leaf level. Level L1 is an intermediate level, which is a child relative to the root level and a parent relative to the leaf level. As will be understood by those skilled in the art, a b*tree of type N–(N+1) (i.e., 2-3, 3-4, 4-5, . . . ) requires all non-root nodes to be between N/(N+1) to 100% capacity (i.e, 67%, 75%, 80%, . . . up to 100%) before and after an insert or delete operation has been fully performed.

FIG. 5A illustrates a portion of a b*tree with excess capacity having three sibling nodes at a leaf level and a parent node at the root level containing the search keys A-K, which represent numeric search key values. The leftmost sibling node contains the search keys A, B and C, the middle sibling node contains the search keys E, F and G and the rightmost sibling node contains the search keys I, J and K. The parent node contains the search keys D and H. These sibling nodes are at 75% capacity, which meets the requirement that all non-root nodes be between N/(N+1) to 100% capacity for a 3-4 type b*tree, where N=3. As illustrated by FIG. 5B, an insertion of the key L into the b*tree of FIG. 5A increases the rightmost sibling node to full capacity without affecting the other two sibling nodes. The additional insertion of key M into the rightmost sibling node in the b*tree of FIG. 5B causes the transfer of key I to the parent node and the transfer of key H from the parent node to the middle sibling node, as illustrated by FIG. 5C.

FIG. 5D illustrates the further insertion of node N into the rightmost sibling node, which causes an overflow that ripples through the parent and middle sibling nodes into the leftmost sibling node, which is now at full capacity. In FIG. 5E, a split between the sibling nodes and an increase in population of the parent node occurs in response to the further insertion of key O into the rightmost sibling node. This split from three to four sibling nodes is necessary to maintain a capacity of all non-root nodes in a range from 75% to 100% capacity, for N=3.

FIGS. 6A-6D illustrate three insertion examples that result in the splitting of sibling nodes having no excess capacity. As illustrated by FIG. 6A, the insertion of any additional key (#) into a b*tree with sibling nodes at full capacity results in a split among the sibling nodes and a repopulation of these nodes at equivalent levels (shown at 75%). In FIG. 6B, the insertion of key D+ into the leftmost sibling node results in a split that causes keys D, G and K to move to the parent node (displacing keys E and J) and a grouping of keys D+, E and F together in a sibling node. In FIG. 6C, the insertion of key I+ into the middle sibling node results in a split that causes keys D, H and K to move to the parent node (displacing keys E and J) and a grouping of keys I, I+ and J together in a sibling node. Finally, in FIG. 6D, the insertion of key N+ into the rightmost sibling node results in a split that causes keys D, H and L to move to the parent node (displacing keys E and J) and a grouping of keys M, N and N+ together in a rightmost sibling node. Thus, as illustrated by FIGS. 6B-6D, the value of the search key to be inserted into sibling nodes having no excess capacity influences the nature of the overflow and regrouping of keys during an operation to split the sibling nodes. This means that conventional hardware to perform insert operations may need to account for every possible insert location that may occur amongst the plurality of sibling nodes.

SUMMARY OF THE INVENTION

Some embodiments of the invention include methods of updating a b-tree data structure (e.g., b*tree data structure) using search key insertion and deletion operations that proceed from respective known states (e.g., respective canonical forms). These insertion operations include inserting a first search key into the b-tree by reconfiguring (e.g., pre-processing) a plurality of sibling nodes of the b-tree into a predetermined overloaded form having a shape that is independent of a value of the first search key to be inserted therein. An operation is then performed to split the sibling nodes by redistributing the first and other search keys among an expanded plurality of the sibling nodes. These insertion operations use a process that trades off possibly performing additional memory accesses (e.g., to shift search keys (and/or handles or pointers) to the predetermined overloaded form) for the certainty that the same key movements are ultimately performed during operations to split sibling nodes. The logical state reduction realized by having to deal with only a single split format results in design simplification and consequently reduces design time and verification effort because of the less varied logic required to implement the design and the reduced number of test cases needed to fully verify the design.

In addition, the deletion operations include deleting a second search key from the b-tree by reconfiguring the plurality of sibling nodes into a predetermined underloaded form having a shape that is independent of a value of the second search key to be omitted therefrom. This underloaded form includes a sibling node at a minimum fill level less one. An operation is then performed to merge the plurality of sibling nodes by redistributing remaining search keys among a reduced plurality of the sibling nodes. Like the case with the insertion operations, the deletion operations use a process that trades off possibly performing additional memory accesses (e.g., to shift search keys (and/or handles or pointers) to the predetermined underloaded form) for the certainty that the same key movements are ultimately performed during operations to merge sibling nodes.

Still further embodiments of the invention include an integrated circuit search engine having a hardware implemented b-tree of search keys therein and at least one maintenance engine for controlling, among other things, insert and delete operations within the b-tree. The maintenance engine, which is electrically coupled to the hardware implemented b-tree of search keys, is configured to insert a first search key into the b-tree by reconfiguring a plurality of sibling nodes of the b-tree into an overloaded form having a shape that is independent of a value of the first search key inserted therein and then performing a split operation on the plurality of sibling nodes by redistributing the first and other search keys among an expanded plurality of the sibling nodes. The maintenance engine is also configured to delete a second search key from the b-tree by reconfiguring the plurality of sibling nodes into an underloaded form having a shape that is independent of a value of the second search key omitted therefrom. The maintenance engine then performs a merge operation on the plurality of sibling nodes by redistributing remaining search keys among a reduced plurality of the sibling nodes.

DESCRIPTION OF PREFERRED EMBODIMENTS

Figures 1, 2:
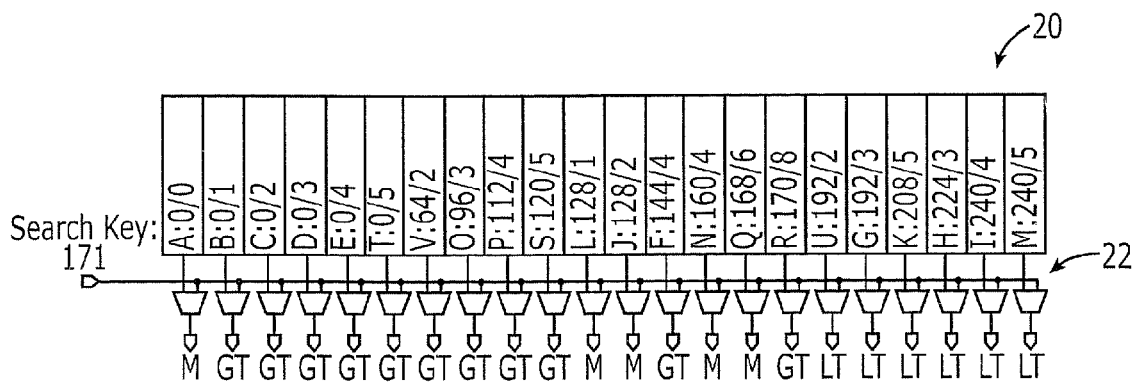
FIG. 1 illustrates a plurality of 8-bit search prefixes of varying prefix length that are sorted linearly based on prefix value (address) and prefix length, according to the prior art.
FIG. 2 illustrates a conventional hardware-based array of search prefixes that supports parallel search operations.
Figure 3:
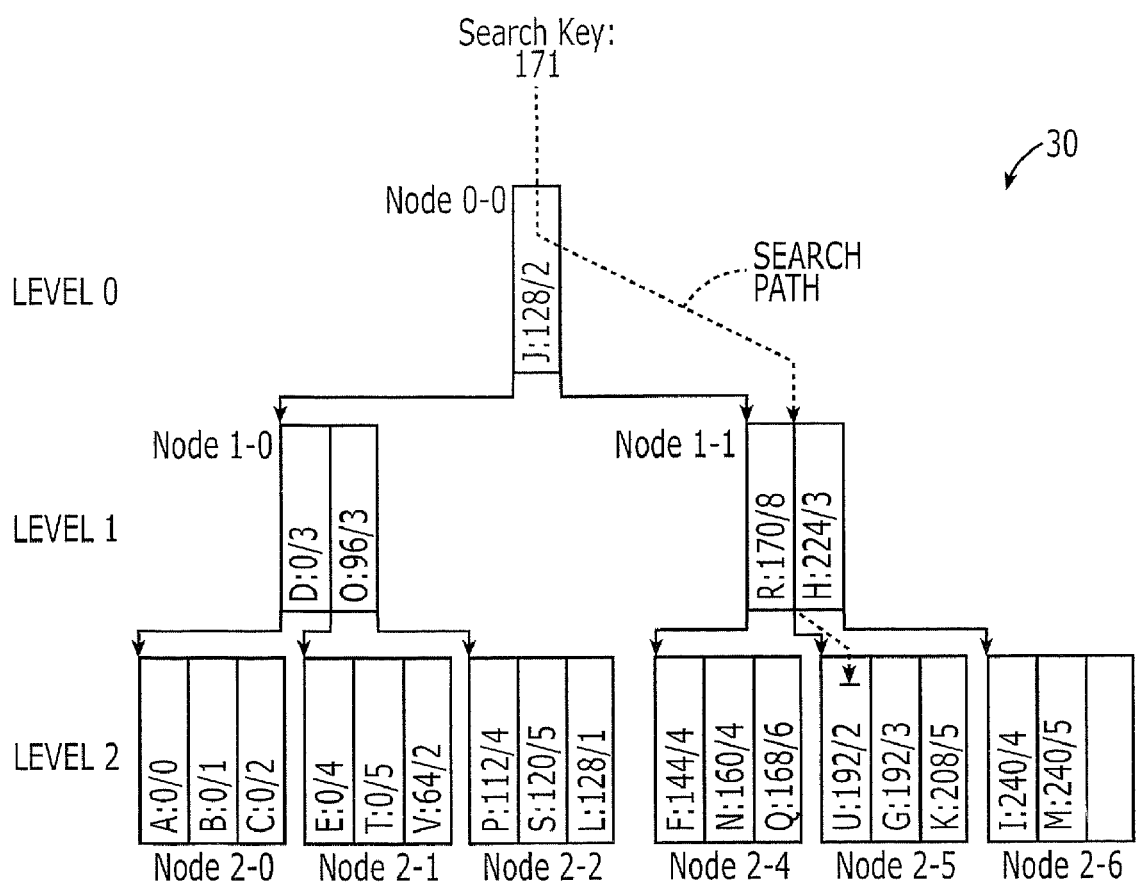
FIG. 3 illustrates a conventional three-level b-tree data structure containing the search prefixes illustrated by FIGS. 1 and 2.
Figure 4:
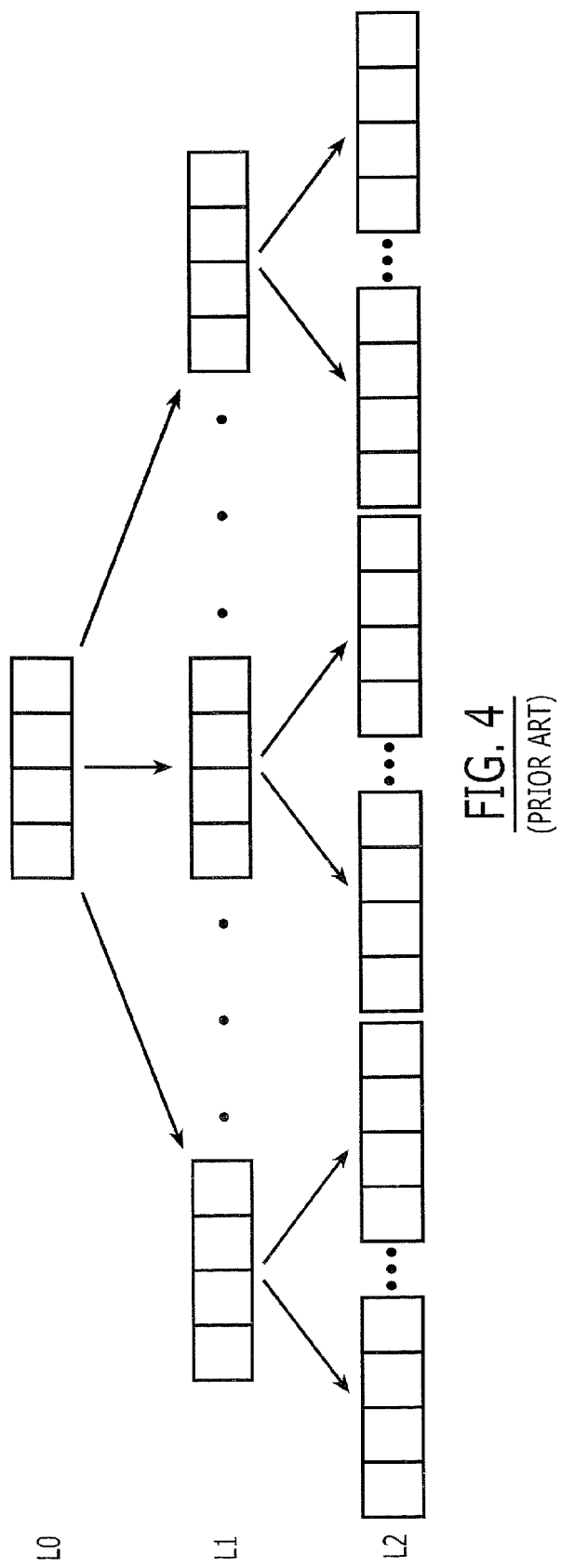
FIG. 4 illustrates a conventional three-level b*tree data structure of ¾ efficiency (i.e., N/(N+1)=¾), having four key locations per node.
Figure 5A:
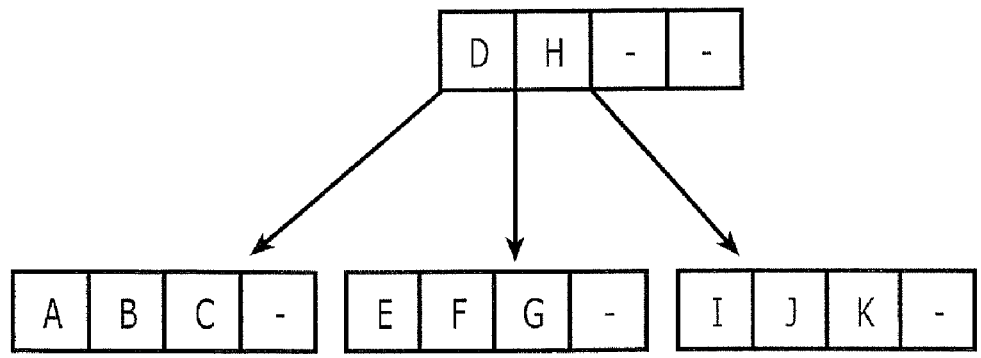
FIG. 5A illustrates a portion of a b*tree having a parent node and three sibling nodes with excess capacity.
Figure 5B:
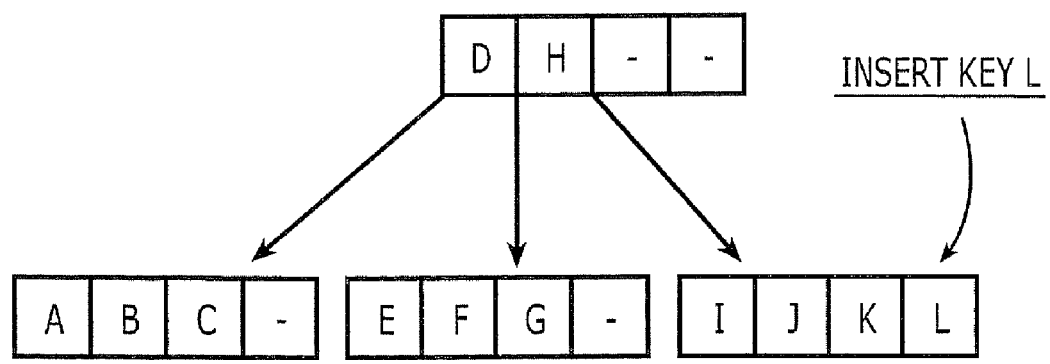
FIG. 5B illustrates an example of a search key insertion into the b*tree of FIG. 5A.
Figure 5C:
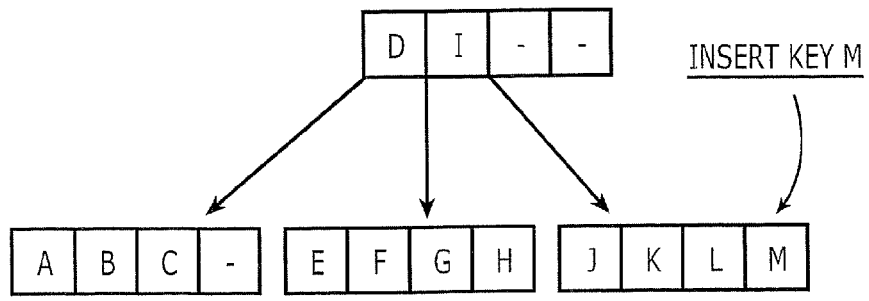
FIG. 5C illustrates an example of a search key insertion into the b*tree of FIG. 5B, which requires an overflow into an adjacent sibling node.
Figure 5D:
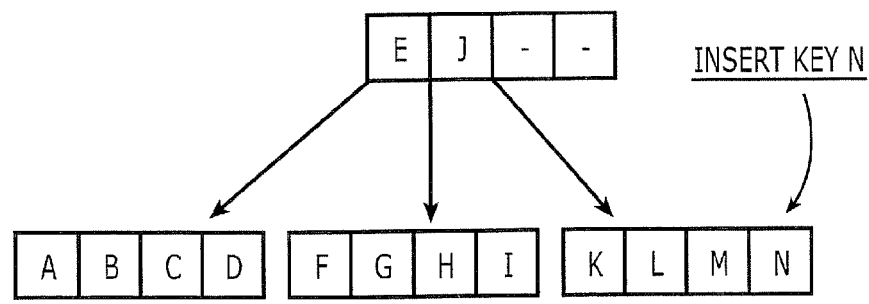
FIG. 5D illustrates an example of a search key insertion into the b*tree of FIG. 5C, which requires an overflow into non-adjacent sibling node.
Figure 5E:
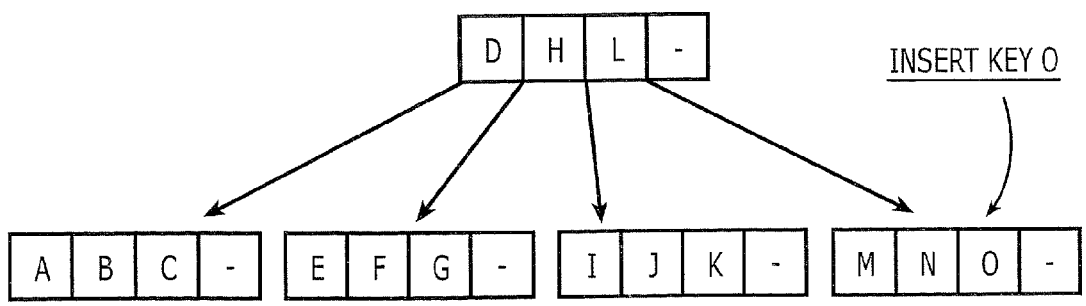
FIG. 5E illustrates an example of a search key insertion into the b*tree of FIG. 5D, which requires a 3-4 split for the b*tree to remain structurally correct.
Figure 6A:
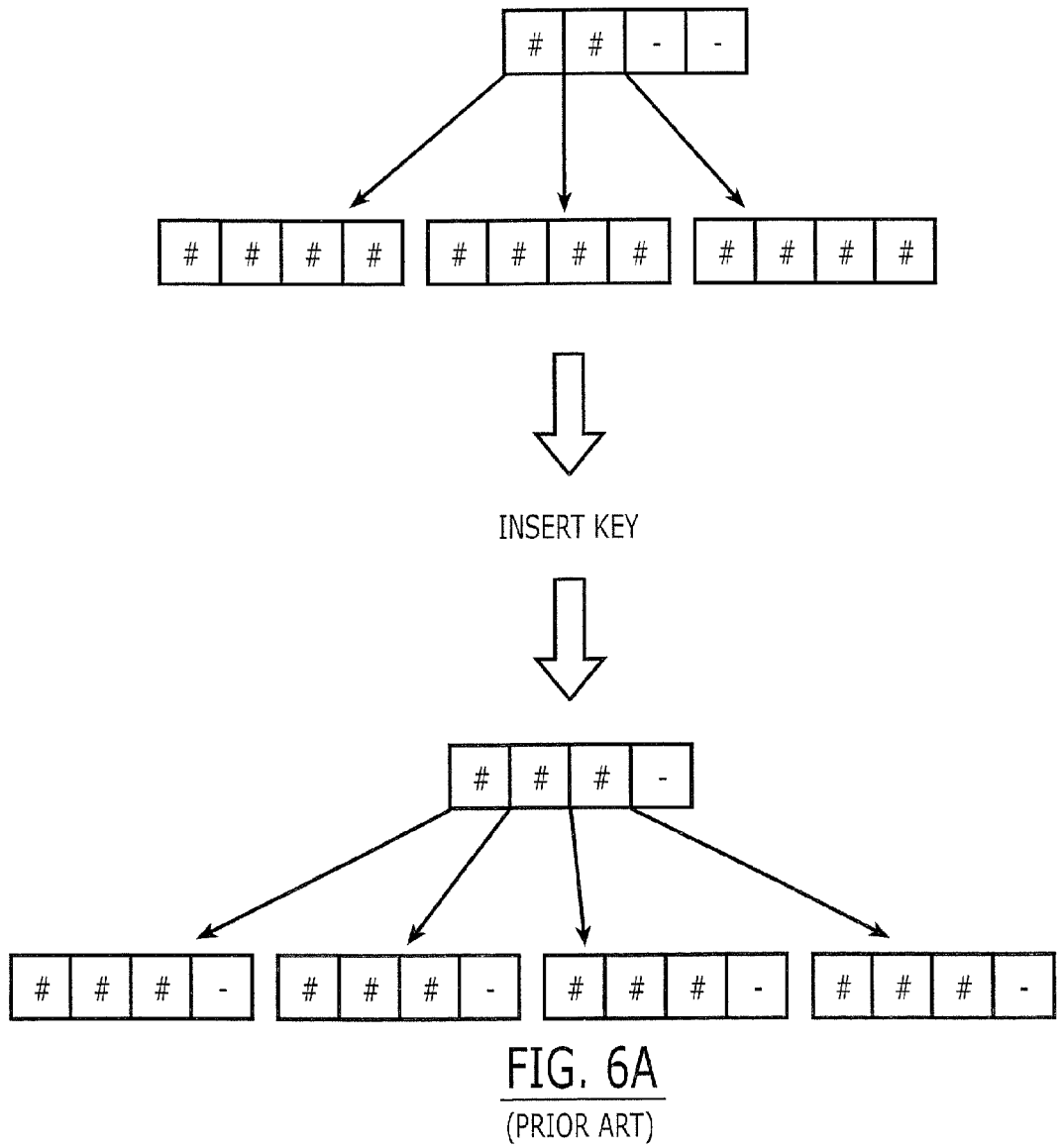
FIG. 6A illustrates an example of a search key insertion into a b*tree that requires a split to remain structurally correct.
Figure 6B:
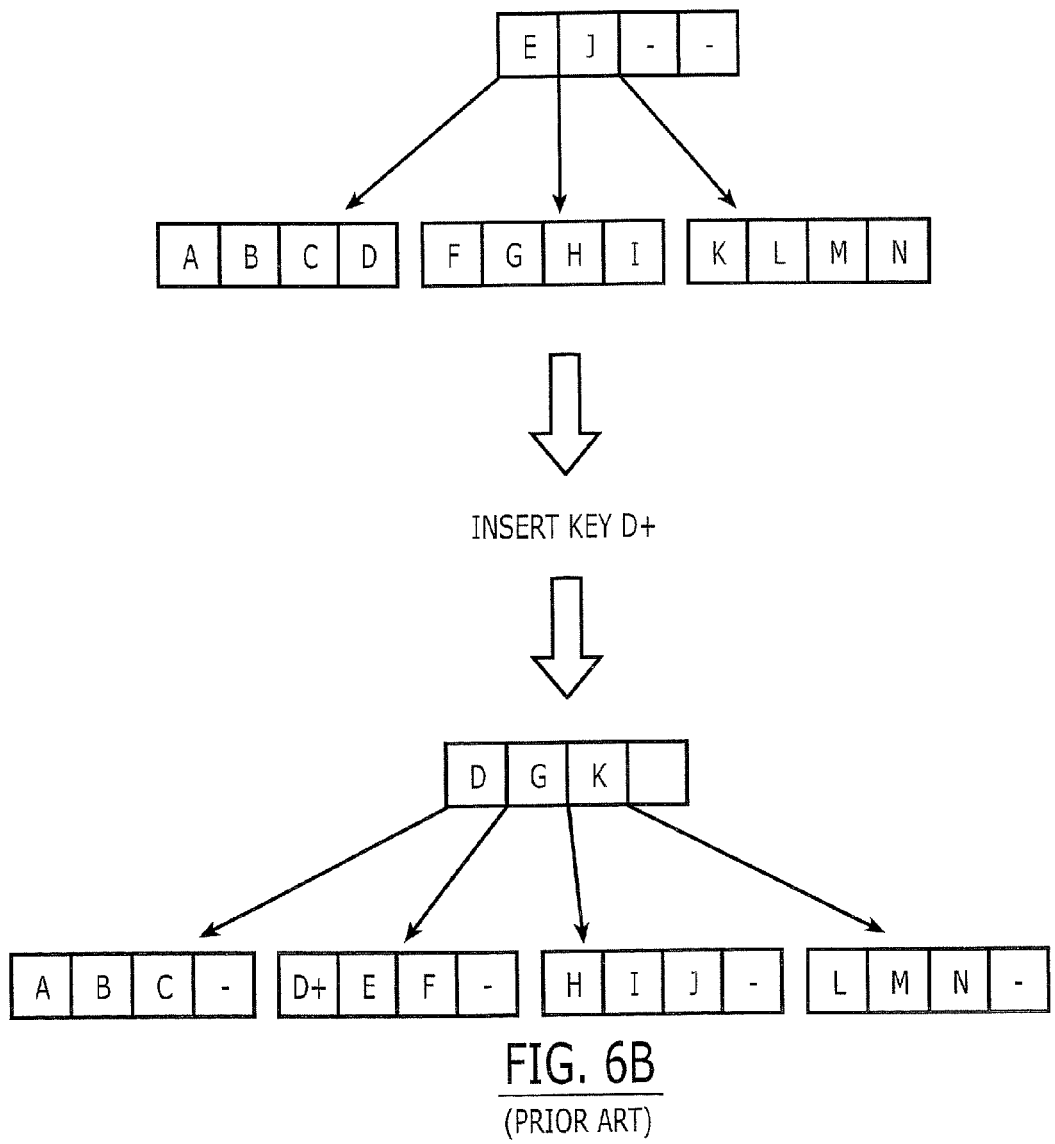
FIG. 6B illustrates an example of a search key insertion (search key D+) into a b*tree that requires a split to remain structurally correct.
Figure 6C:
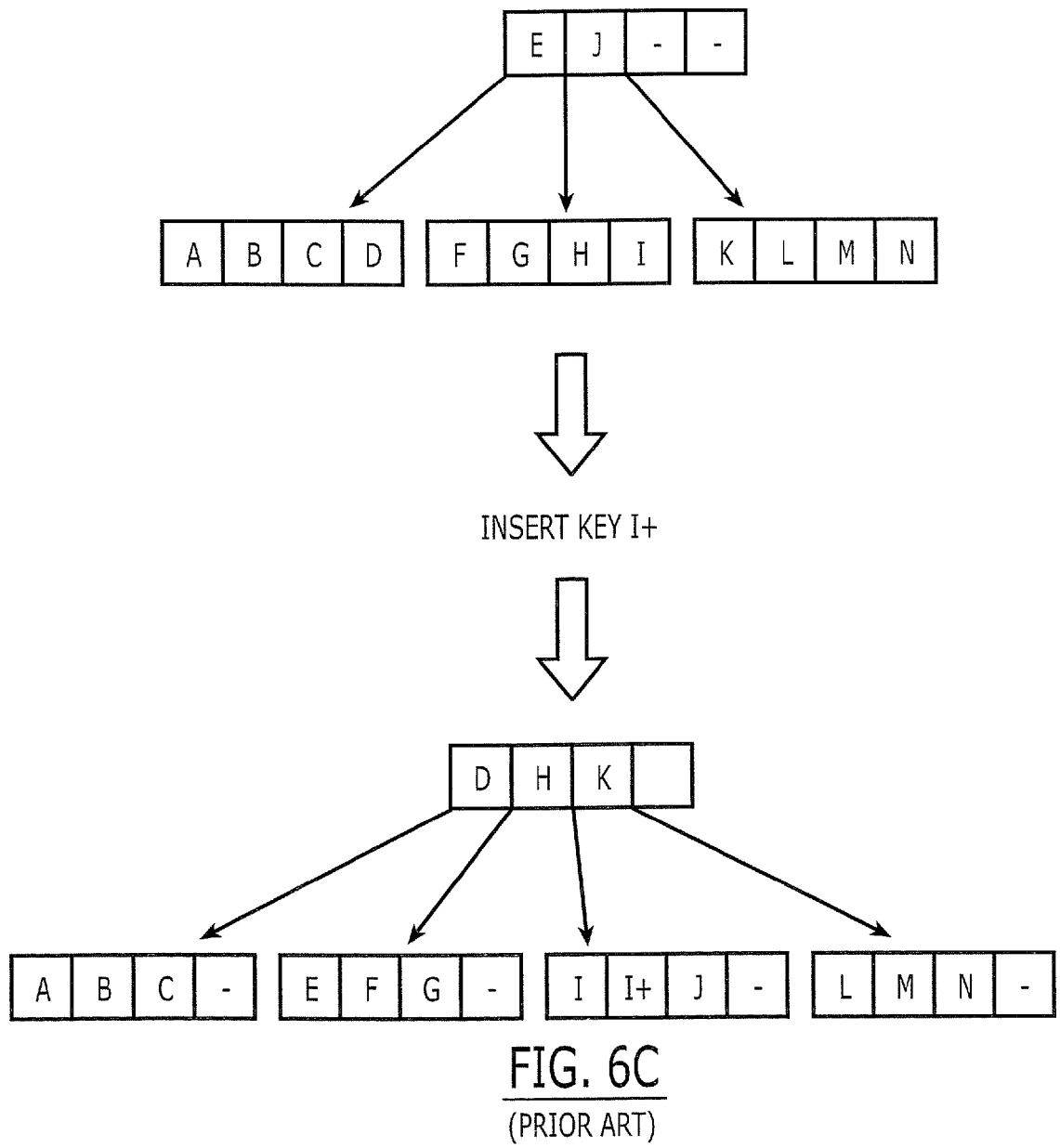
FIG. 6C illustrates an example of a search key insertion (search key I+) into a b*tree that requires a split to remain structurally correct.
Figure 6D:
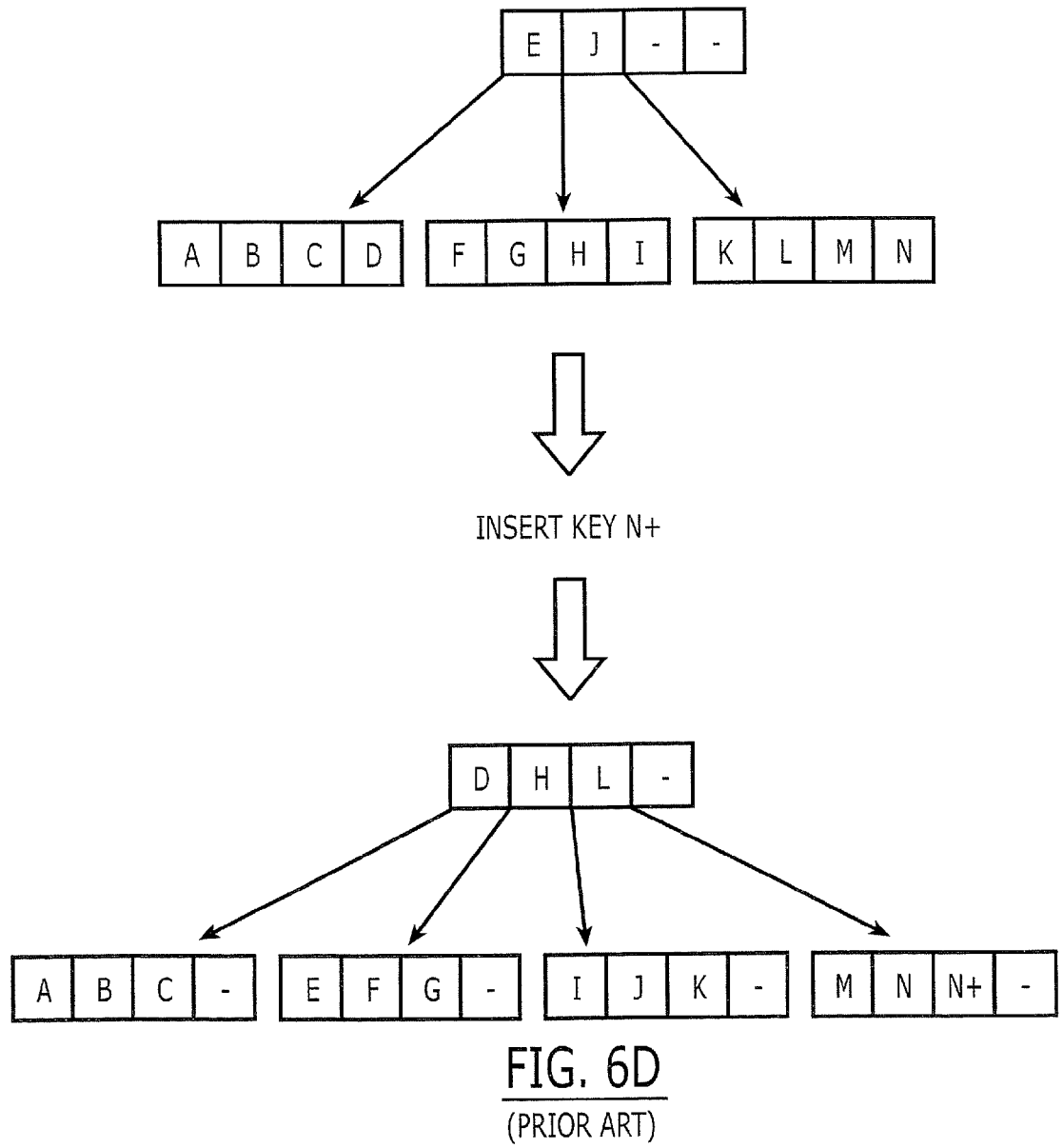
FIG. 6D illustrates an example of a search key insertion (search key N+) into a b*tree that requires a split to remain structurally correct.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. For example, although a pipelined b-tree implementation is disclosed herein (see, e.g., FIG. 9), additional embodiments of the invention can include heap (fully shared memory levels) or hybrid (some sharing of memory levels) memory models that support a b-tree data structure. Like reference numerals refer to like elements throughout.

Figure 7A:
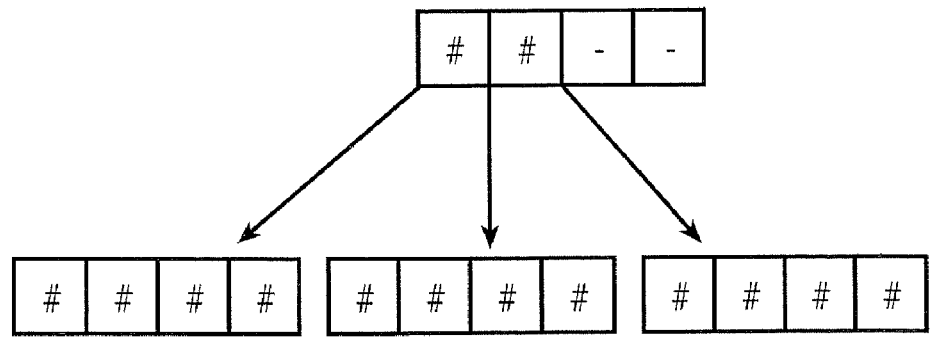
FIG. 7A illustrates how an insertion of a search key into a b*tree includes preprocessing of nodes into an overloaded form, according to embodiments of the invention.
Figure 7A:
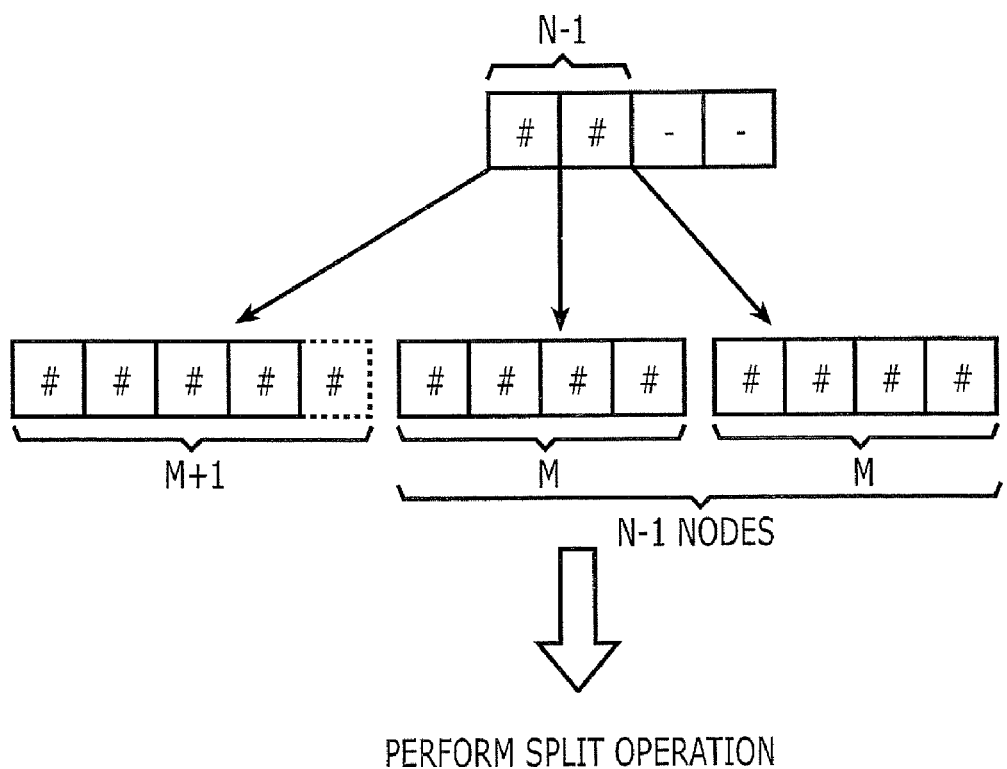

FIG. 7A illustrates operations to insert a search key into a b*tree having sibling nodes with no excess capacity, according to embodiments of the present invention. The three sibling nodes illustrated at the top of FIG. 7A are each filled with four search keys, which are shown generically by the reference character "#". This means the insertion of a new search key in the b*tree will ultimately result in a splitting of the three adjacent sibling nodes into an expanded plurality of adjacent sibling nodes (i.e., four sibling nodes). The population of the parent node, shown as a root node, also increases by one (i.e., from 2 to 3 search keys).

According to embodiments of the invention, the operations to split the sibling nodes within the b*tree are preceded by operations to pre-process the shape of the b*tree into a canonical form, which is shown as an overloaded form. This overloaded form is shown as overloading the leftmost sibling node to a level of M+1, where M is the maximum number of keys per node in the b*tree. The sibling node immediately adjacent the leftmost sibling node is loaded to a level of M and the remaining N−2 sibling nodes on the right side are also loaded to levels of M. In alternative embodiments of the invention, a sibling node other than the leftmost sibling node may be processed into an overloaded form for insert cases, with the remaining sibling nodes being allocated with M search keys. Thus, the location of the sibling node that is pre-processed into an overloaded form is arbitrary from a logic design standpoint. Nonetheless, the location must remain consistent to achieve the desired reductions in state machine complexity that are associated with processing insert instructions, which are received by a search engine device containing a hardware implemented b-tree of search keys.

Figure 7B:
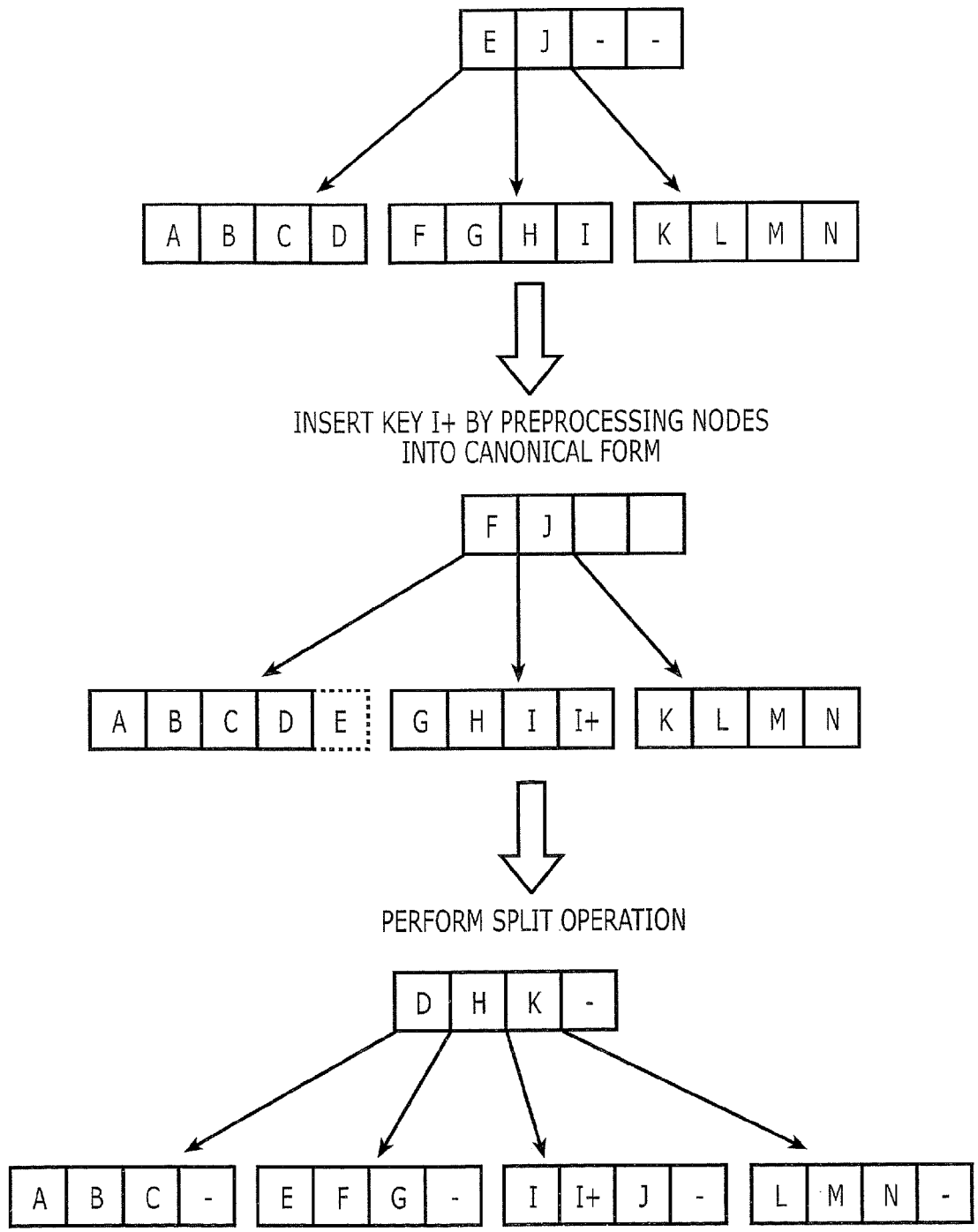
FIG. 7B illustrates an example of an insertion of a search key into a b*tree, according to the embodiments of FIG. 7A.

One example of the operations illustrated by FIG. 7A is illustrated by FIG. 7B. In particular, FIG. 7B illustrates operations to insert search key I+ into a b*tree having no excess capacity. As illustrated at the top of FIG. 7B, this b*tree includes search keys A-D, F-I and K-N in the sibling nodes and search keys E and J in the parent node. The pre-processing of the b*tree into the canonical form illustrated by FIG. 7A results in the formation of an overloaded leftmost sibling node containing search keys A-E, a middle sibling node containing search keys G-I and I+ and a rightmost sibling node containing search keys K-N. This canonical form of the b*tree structure is illustrated in the middle of FIG. 7B. A node splitting operation is then performed to convert the overloaded b*tree structure into the valid b*tree structure at the bottom of FIG. 7B, which contains four sibling nodes at 75% capacity.

Figure 7C:
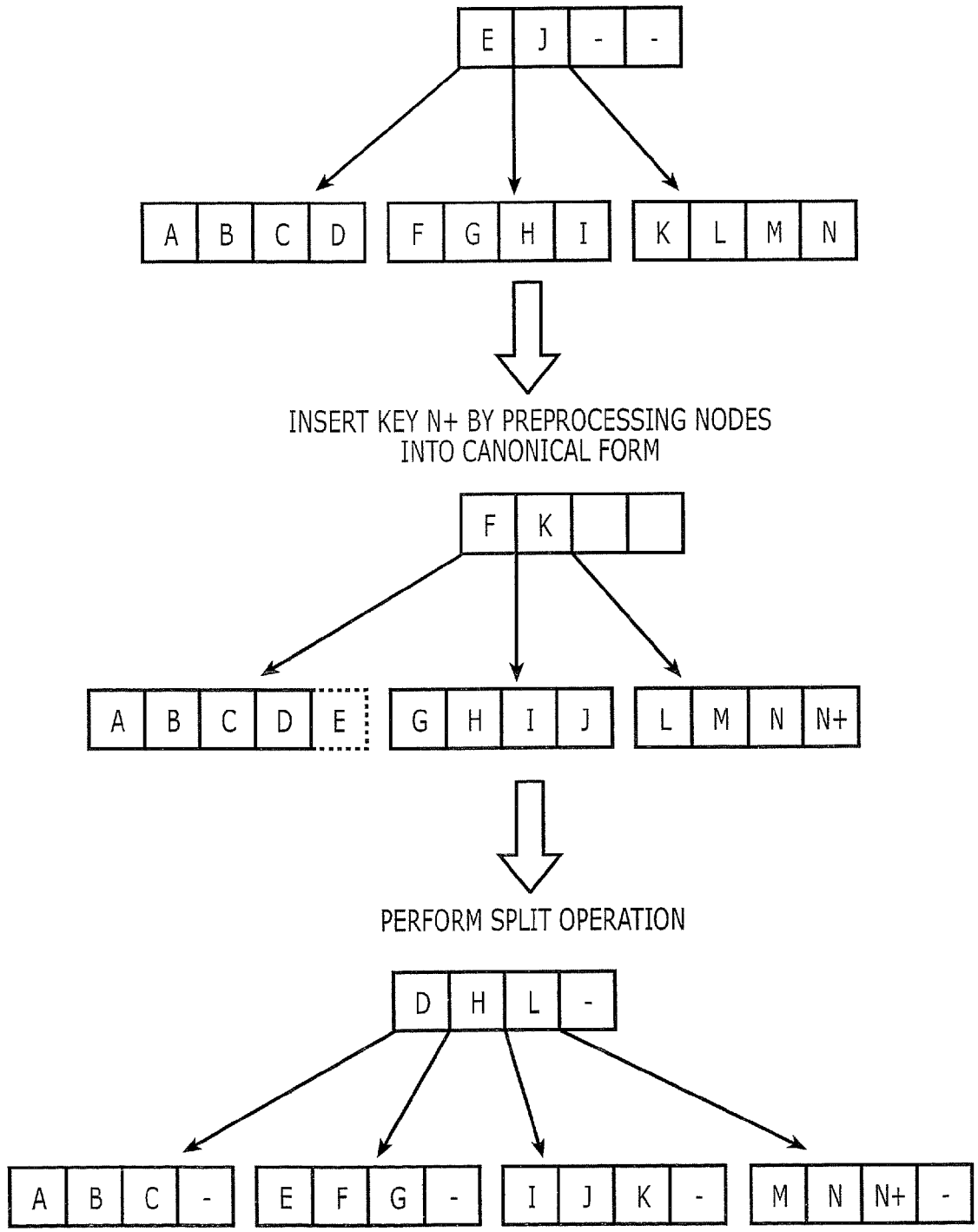
FIG. 7C illustrates an example of an insertion of a search key into a b*tree, according to the embodiments of FIG. 7A.

Another example of the operations illustrated by FIG. 7A is illustrated by FIG. 7C. In particular, FIG. 7C illustrates operations to insert search key N+ into a b*tree having no excess capacity. As illustrated at the top of FIG. 7C, this b*tree includes search keys A-D, F-I and K-N in the sibling nodes and search keys E and J in the parent node. The pre-processing of the b*tree into the overloaded canonical form illustrated by FIG. 7A results in the formation of an overloaded leftmost sibling node containing search keys A-E, a middle sibling node containing search keys G-J and a rightmost sibling node containing search keys L-N and N+. This canonical form of the b*tree structure is illustrated in the middle of FIG. 7C. A node splitting operation is then performed to convert the overloaded b*tree structure into the valid b*tree structure at the bottom of FIG. 70, which contains four sibling nodes at 75% capacity. Accordingly, the b*tree structures in FIGS. 7B and 7C are processed into an overloaded format having a shape that remains unchanged regardless of the value of the search key to be inserted (e.g., I+ or N+). In this manner, the insertion process trades off possibly performing additional memory accesses (e.g., to shift search keys (and/or handles or pointers) to the predetermined overloaded format) for the certainty that the same key movements are ultimately performed for each and every split operation among sibling nodes. The logical state reduction realized by having to deal with only a single split format results in design simplification and consequently reduces design time and verification effort because of the less varied logic required to implement the design and the reduced number of test cases needed to fully verify the design.

Figure 8A:
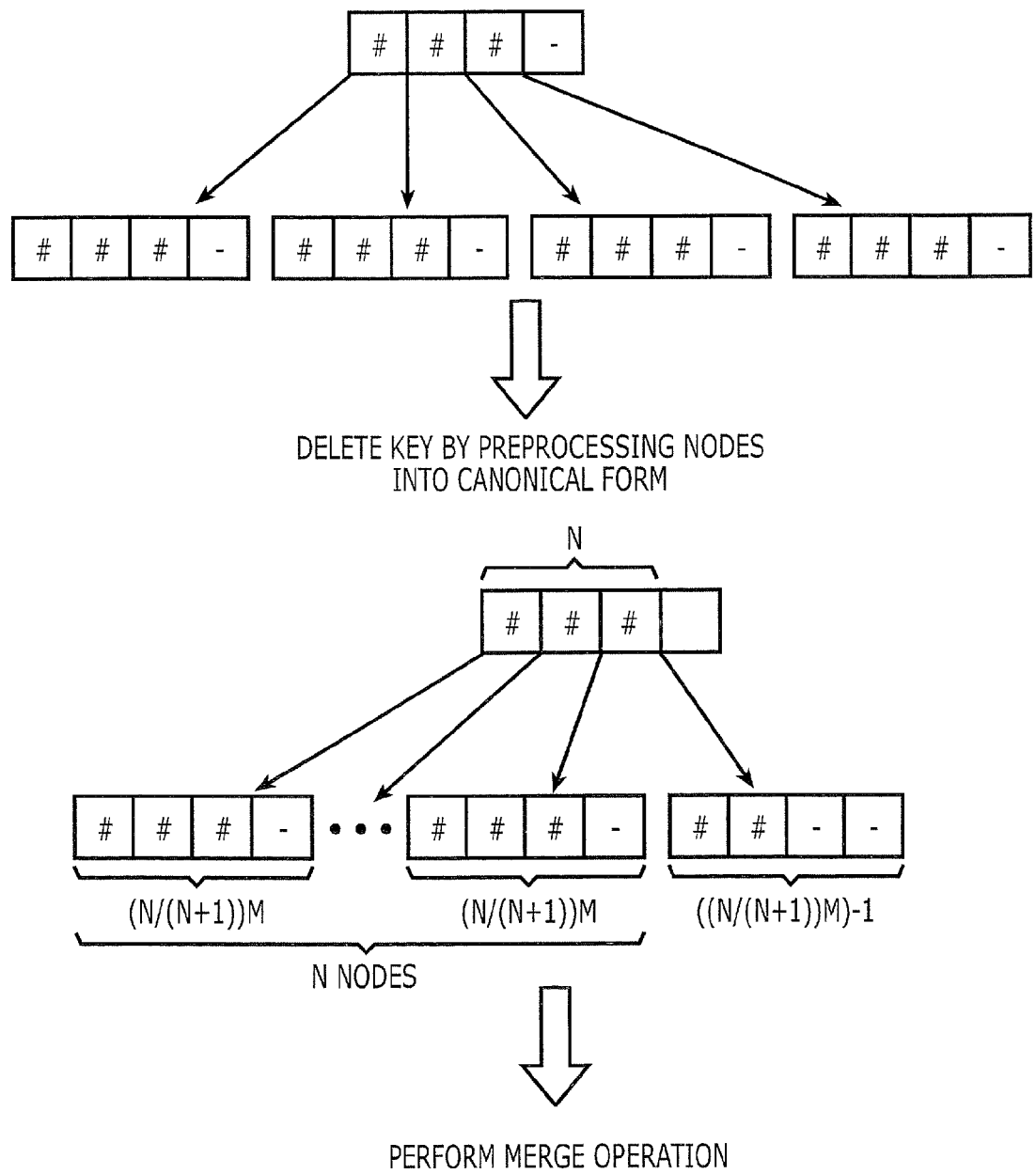
FIG. 8A illustrates how a deletion of a search key from a b*tree includes preprocessing of nodes into an underloaded form, according to embodiments of the invention.
Figure 8B:
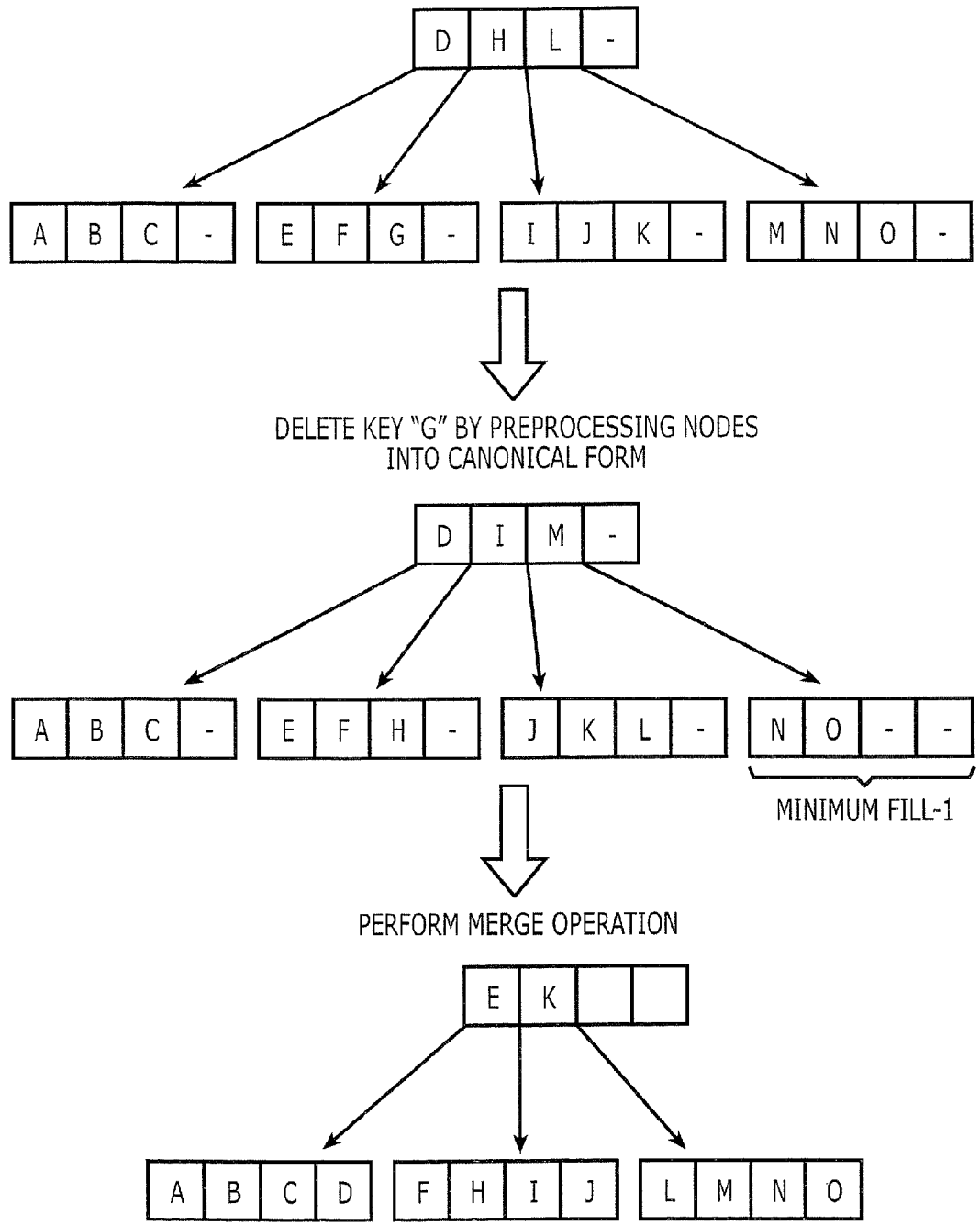
FIG. 8B illustrates an example of a deletion of a search key from a b*tree, according to the embodiments of FIG. 8A.

Moreover, as illustrated by FIGS. 8A-8B, operations to pre-process sibling nodes of a b*tree into a canonical form that is suitable for processing delete instructions includes establishing one sibling node at a minimum fill capacity less one (i.e., $((N/(N+1))M)-1$). In particular, FIG. 8A illustrates operations to delete a search key from a b*tree having sibling nodes at minimum fill levels, according to embodiments of the present invention. The four sibling nodes illustrated at the top of FIG. 8A are each filled with three search keys, which are shown generically by the reference character "#". This means the deletion of a search key from the b*tree will ultimately result in a merging of the four adjacent sibling nodes into a reduced number of adjacent sibling nodes (i.e., three sibling nodes). The population of the parent node, shown as a root node, also decreases by one (i.e., from 3 to 2 search keys).

According to these embodiments, the operations to merge the sibling nodes within the b*tree are preceded by operations to pre-process the shape of the b*tree into a canonical form, which is shown as an underloaded form. This underloaded form is shown as including a rightmost sibling node that is filled to a minimum level less one (i.e., $((M(N/(N+1))-1)$). Thus, as illustrated by the b*tree of FIG. 8B, which illustrates four sibling nodes containing search keys A-C, E-G, I-K and M-O and a parent node containing keys D, H and L, an operation to delete key "G" from the b*tree initially causes the parent node to be rearranged to contain keys D, I and M and causes the three leftmost sibling nodes to contain keys: A-C; E, F and H; and J, K and L. The rightmost sibling node is also pre-processed to contain only keys N and O, which is below the minimum fill capacity of three keys per node for a b*tree of type 3-4. Thereafter, a merge operation is performed to rearrange the keys within a reduced number of sibling nodes, which are now at full capacity.

Figure 9:
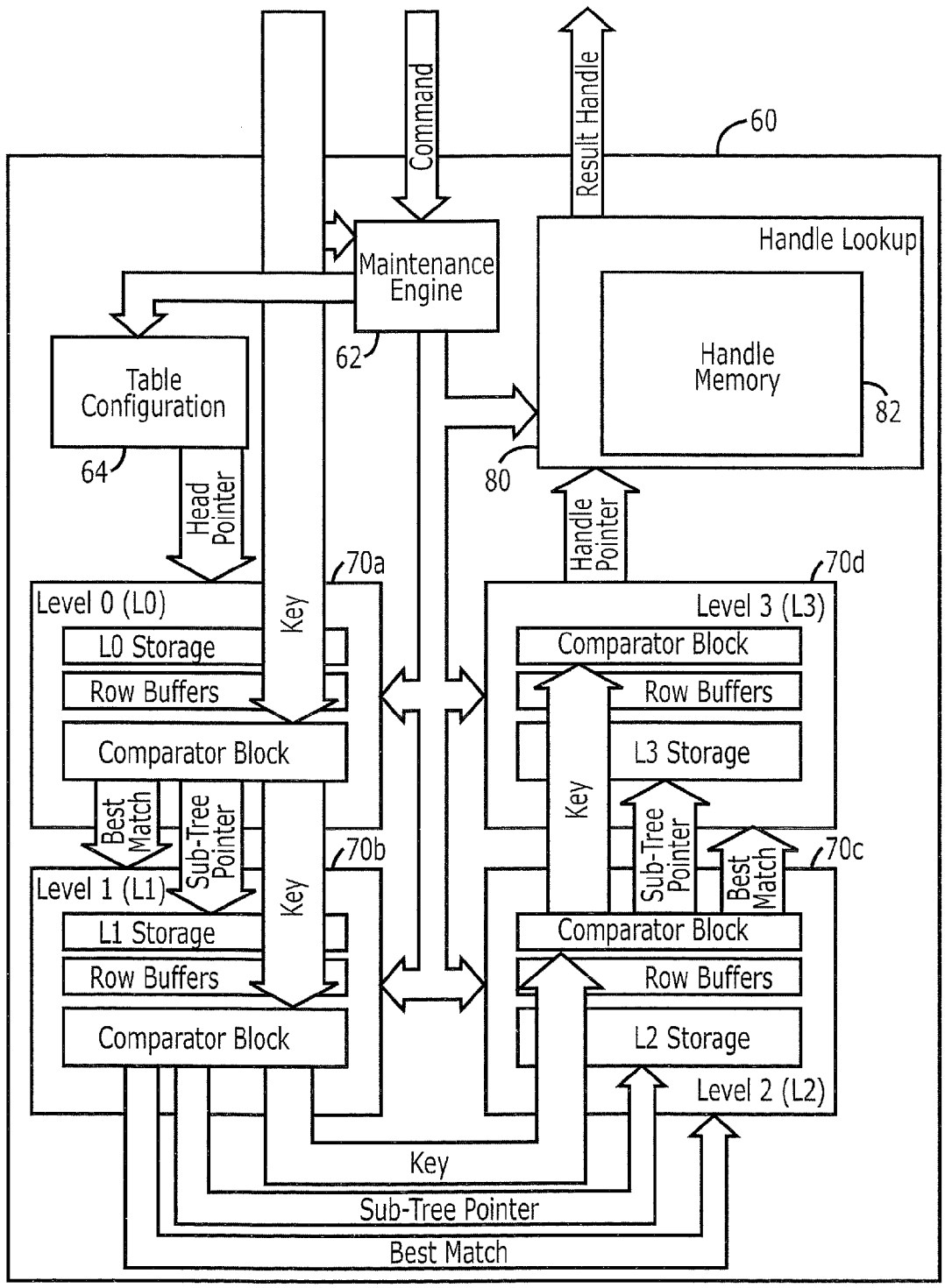
FIG. 9 is a block diagram of a pipelined search engine device that supports operations illustrated by FIGS. 7A-7C and 8A-8B.

FIG. 9 illustrates a block diagram of a pipelined search engine device 60 that supports the above-described b-tree data structures and handle memory and is responsive to applied search keys and commands. This search engine device 60, which supports multiple four-level b-trees as separate tables (i.e., databases) that share the same node storage and search logic, includes a plurality of pipeline stages 70a-70d dedicated to each b-tree level and a separate pipeline stage 80 for the final result handle lookup and generation of result handles. The first pipeline stage 70a represents a Level 0 block (L0) of the b-tree containing Level 0 storage elements, row buffers (optional in some designs) and comparator logic. The first pipeline stage 70a is responsive to a head pointer and a key. The second pipeline stage 70b represents a Level 1 block (L1) containing Level 1 storage elements, row buffers (optional in some designs) and comparator logic. The second pipeline stage 70b is responsive to a sub-tree pointer, a best match result generated by the first pipeline stage 70a and the key. Similarly, the third pipeline stage 70c represents a Level 2 block (L2) containing Level 2 storage elements, row buffers (optional in some designs) and comparator logic. The third pipeline stage 70c is responsive to a sub-tree pointer, a best match result generated by the second pipeline stage 70b and the key. The fourth pipeline stage 70d represents a Level 3 block (L3) containing Level 3 storage elements, row buffers (optional in some designs) and comparator logic. The fourth pipeline stage 70d is responsive to a sub-tree pointer, a best match result generated by the third pipeline stage 70c and the key. The final pipeline stage is a handle lookup stage 80, which performs handle lookup operations within a handle memory 82 to thereby generate a result handle in response to a handle block pointer.

A table maintenance engine 62 is also provided, which contains a plurality of sub-engines that integrate with corresponding ones of the four pipeline stages 70a-70d and the handle lookup stage 80. This table maintenance engine 62 performs operations including the search key insertion and deletion operations described with respect to FIGS. 7A-7C and 8A-8B during idle search clock cycles. A table configuration circuit 64 is provided, which can support multiple search trees and map a table ID associated with a received search request to a tree head pointer (HEAD POINTER) for the corresponding table. Because of the pipelined structure of the search engine device 60, the maximum search rate can equal the maximum clock speed supported by the four pipeline stages 70a-70d and the handle lookup stage 80.

The table maintenance engine 62 receives search keys and commands on behalf of the search engine device 60 and forwards search commands to the table configuration circuit 64. The table maintenance engine 62 also queues up any key insert and delete (update) commands it receives for processing because key insertion and deletion typically cannot be completed in a simple single pass through the search engine pipeline. When idle command cycles indicate there are memory access opportunities available to perform table maintenance accesses on the memories (L0, L1, L2, L3) within each pipeline stage 70a-70d and the handle memory 82 within the handle lookup stage 80, the maintenance engine 62 performs maintenance accesses corresponding to portions of a key insert or delete request. The maintenance engine 62 processes one insert or delete request at a time and manages search memory node allocation to thereby allocate free nodes when needed to process key inserts and returning freed nodes to a pool when freed during deletes. To ensure search coherency and permit searching while the maintenance engine 62 processes a key update, the maintenance engine 62 makes a copy of nodes that must be modified while processing updates and only modifies these "temporary" copies. Once all node copies have been modified at all necessary levels for a key update, the maintenance engine 62 updates pointers in all necessary search levels to point to the modified node copies it was working on and reclaims the original nodes, which were copied, for future use. These pointers are updated in a manner that preserves search coherency on every lookup.

Once all temporary node copies at all levels have been properly updated, a special command is executed within the pipeline of stages to thereby cause each level of the b-tree to point to the node copies and reclaim the nodes that are being replaced. This update process propagates through the pipeline across all level at the same speed as a search command. Accordingly, all searches that enter the pipeline before the special command will search against a database before any changes pertaining to the update are applied, but any searches that enter the pipeline after the special command will search against a database that appears to have been instantly and completely modified to reflect the update.

The table configuration circuit 64 receives search commands from the maintenance engine 62, which include a table ID for the table to be searched. The table configuration circuit 64 then maps the table ID, corresponding to a unique b-tree within the search engine device 60, to a root tree node pointer in the Level 0 block 70a. The table configuration circuit 64 then forwards this pointer to the Level 0 block 70a instructing it to perform a search starting at the root node pointed to by the root tree node pointer.

Each of the Level 0, Level 1 and Level 2 blocks 70a-70c corresponds to one of the upper three levels of an SPM b-tree, which is described more fully in U.S. application Ser. No. 11/184,243, filed Jul. 19, 2005. Each level receives a search key, a sub-tree pointer and an indication of the best match found by the previous levels in the search. In the case of the Level 0 block 70a, which can only represent the root level in the b-tree, this best match indication is always null. A Level 0, Level 1 or Level 2 block reads a search node from its node storage based on the sub-tree pointer it receives and buffers it in a set of flip-flops within its respective row buffer sub-block. Each node stores a set of keys, SPM bit-masks and sub-tree pointers. The comparator sub-block compares the search key to all of the keys and the SPM bit-masks read from the node storage sub-block and determines the best match for the search key, if any, and also determines which of the node's sub-tree pointers the search should follow for the next level of the search. The Level 0, Level 1 or Level 2 block forwards the sub-tree pointer it finds to the next lower level block along with the search key. If the next lower level block finds a new best match, then this best match for the search key is forwarded to the next lower level search stage. However, if no new best match is found, then the best match from the previous higher stage is forwarded to the next stage.

The Level 4 block corresponds to the leaf level of the SPM b-tree. It receives a search key, sub-tree pointer and any indication of a best match from the previous levels in the search. The Level 4 block reads a search node from its node storage based on the sub-tree pointer that it receives and buffers it in a set of flip-flops within its row buffer sub-block. The comparator sub-block compares the search key to all of the keys read from the node storage sub-block and determines a best match, if any. If the Level 4 block finds a new best match for the search key, then it forwards its own best match as the handle pointer to the handle lookup block 80. Otherwise, if no new best match is found, then the best match received from the prior stage is passed as the handle pointer.

The handle lookup block 80 receives an indication of the best match found by the Level 0-Level 3 search stages 70a-70d and uses the best match as an index to lookup a search result handle in the handle memory 82. In response to the index, the handle memory 82 outputs a retrieved handle as the result handle (i.e., the search result).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of updating a b-tree of search keys within a search engine, comprising the steps of:
inserting a first search key into the b-tree by reconfiguring a plurality of sibling nodes of the b-tree into an overloaded form having a shape that is independent of a value of the first search key inserted therein and then performing a split operation on the plurality of sibling nodes by redistributing the first and other search keys among an expanded plurality of the sibling nodes; and
deleting a second search key from the b-tree by reconfiguring the plurality of sibling nodes into a predetermined underloaded form having a shape that is independent of a value of the second search key omitted therefrom and then performing a merge operation on the plurality of sibling nodes by redistributing remaining search keys among a reduced plurality of the sibling nodes.

2. The method of claim 1, wherein the b-tree is a b*tree of type N–(N+1), where N is a positive integer greater than one; and wherein the predetermined underloaded form includes a sibling node at a minimum fill level less one.

3. The method of claim 1, wherein the overloaded form is a canonical form.

4. An integrated circuit search engine, comprising:
a hardware implemented b-tree of search keys; and
a maintenance engine electrically coupled to said hardware implemented b-tree of search keys, said maintenance engine configured to insert a first search key into the b-tree by reconfiguring a plurality of sibling nodes of the b-tree into an overloaded form having a shape that is independent of a value of the first search key inserted therein and then performing a split operation on the plurality of sibling nodes by redistributing the first and other search keys among an expanded plurality of the sibling nodes, wherein said maintenance engine is further configured to delete a second search key from the b-tree by reconfiguring the plurality of sibling nodes into a predetermined underloaded form having a shape that is independent of a value of the second search key omitted therefrom and then performing a merge operation on the plurality of sibling nodes by redistributing remaining search keys among a reduced plurality of the sibling nodes.

5. The integrated circuit search engine of claim 4, wherein the overloaded form is a canonical form.

* * * * *